United States Patent
Ghosh et al.

(10) Patent No.: US 10,348,495 B2
(45) Date of Patent: Jul. 9, 2019

(54) CONFIGURABLE CRYPTO HARDWARE ENGINE

(71) Applicant: Intel Corporation, Santa Clara, CA (US)

(72) Inventors: Santosh Ghosh, Hillsboro, OR (US); Rafael Misoczki, Hillsboro, OR (US); Manoj R. Sastry, Portland, OR (US); Li Zhao, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 292 days.

(21) Appl. No.: 15/441,030

(22) Filed: Feb. 23, 2017

(65) Prior Publication Data

US 2018/0241554 A1    Aug. 23, 2018

(51) Int. Cl.
*H04L 9/08* (2006.01)
*H04L 9/32* (2006.01)
(Continued)

(52) U.S. Cl.
CPC ............ *H04L 9/0861* (2013.01); *H04L 9/002* (2013.01); *H04L 9/0643* (2013.01);
(Continued)

(58) Field of Classification Search
CPC ..... H04L 9/0861; H04L 9/0643; H04L 9/002; H04L 2209/38; H04L 2209/12
(Continued)

(56) References Cited

U.S. PATENT DOCUMENTS 6,694,436 B1 * 2/2004 Audebert ............... G06Q 20/04
                                                    707/999.202
8,732,457 B2 * 5/2014 Micali .................... G06Q 20/02
                                                    340/426.28
(Continued)

OTHER PUBLICATIONS

Johannes Buchmann et al., "XMSS—A Practical Forward Secure Signature Scheme based on Minimal Security Assumptions", Nov. 2011, 22 pages, retrieved from: https://eprint.iacr.org/2011/484.pdf.
(Continued)

*Primary Examiner* — Teshome Hailu
(74) *Attorney, Agent, or Firm* — Schwabe, Williamson & Wyatt, P.C.

(57) ABSTRACT

Apparatuses and methods associated with configurable crypto hardware engine are disclosed herein. In embodiments, an apparatus for signing or verifying a message may comprise: a hardware hashing computation block to perform hashing computations; a hardware hash chain computation block to perform successive hash chain computations; a hardware private key generator to generate private keys; and a hardware public key generator to generate public keys, including signature generations and signature verifications. The hardware hashing computation block, the hardware hash chain computation block, the hardware private key generator, and the hardware public key generator may be coupled to each other and selectively cooperate with each other to perform private key generation, public key generation, signature generation or signature verification at different points in time. Other embodiments may be disclosed or claimed.

23 Claims, 5 Drawing Sheets

(51) Int. Cl.
 *H04L 9/00* (2006.01)
 *H04L 9/06* (2006.01)
(52) U.S. Cl.
 CPC .......... *H04L 9/3236* (2013.01); *H04L 9/3247* (2013.01); *H04L 2209/12* (2013.01); *H04L 2209/38* (2013.01)
(58) Field of Classification Search
 USPC ......................................................... 713/168
 See application file for complete search history.

(56) References Cited

U.S. PATENT DOCUMENTS

| | | | |
|---|---|---|---|
| 9,317,708 B2 * | 4/2016 | Lee ..................... | G06F 21/6218 |
| 2010/0042824 A1 * | 2/2010 | Lee ..................... | G06F 21/6218 |
| | | | 713/2 |
| 2018/0183577 A1 * | 6/2018 | Suresh ................. | H04L 9/0643 |

OTHER PUBLICATIONS

Andreas Husling, "W-OTS+—Shorter Signatures for Hash-Based Signature Schemes", 2013, 18 pages, retrieved from: https://huelsing.files.wordpress.com/2013/05/wotsspr.pdf.

Pei Luo et al., "Side-Channel Analysis of MAC-Keccak Hardware Implementations", 2015, 13 pages, retrieved from: https://eprint.iacr.org/2015/411.

XMSS: Extended Hash-Based Signatures, 3 pages, retrieved on Feb. 27, 2017 from: https://datatracker.ietf.org/doc/draft-irtf-cfrg-xmss-hash-based-signatures/.

* cited by examiner

CONFIGURABLE CRYPTO HARDWARE ENGINE

TECHNICAL FIELD

The present disclosure relates to the field of computing, in particular, to apparatuses and methods associated with a configurable crypto hardware engine for signing and verifying messages that may withstand attacks using quantum computers.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Cryptography is commonly employed to secure communication. In particular, asymmetric cryptography with private and public keys are used to sign and verify messages. Examples of asymmetric cryptography include Elliptic Curve and Ron Rivest, Adi Shamir and Leonard Adleman (RSA) cryptography. However, with the emergence of quantum computers, most of today's implementations of asymmetric cryptography for signing and verifying messages may become vulnerable to attacks. The potential vulnerability may be especially problematic for the development and deployment of Internet-of-Things, which may collect/process/exchange valuable information. Generally, it is expect that most of these data need to be secured. And the ability to secure the large volume of IoT data messages may be critical to the long term success of IoT.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
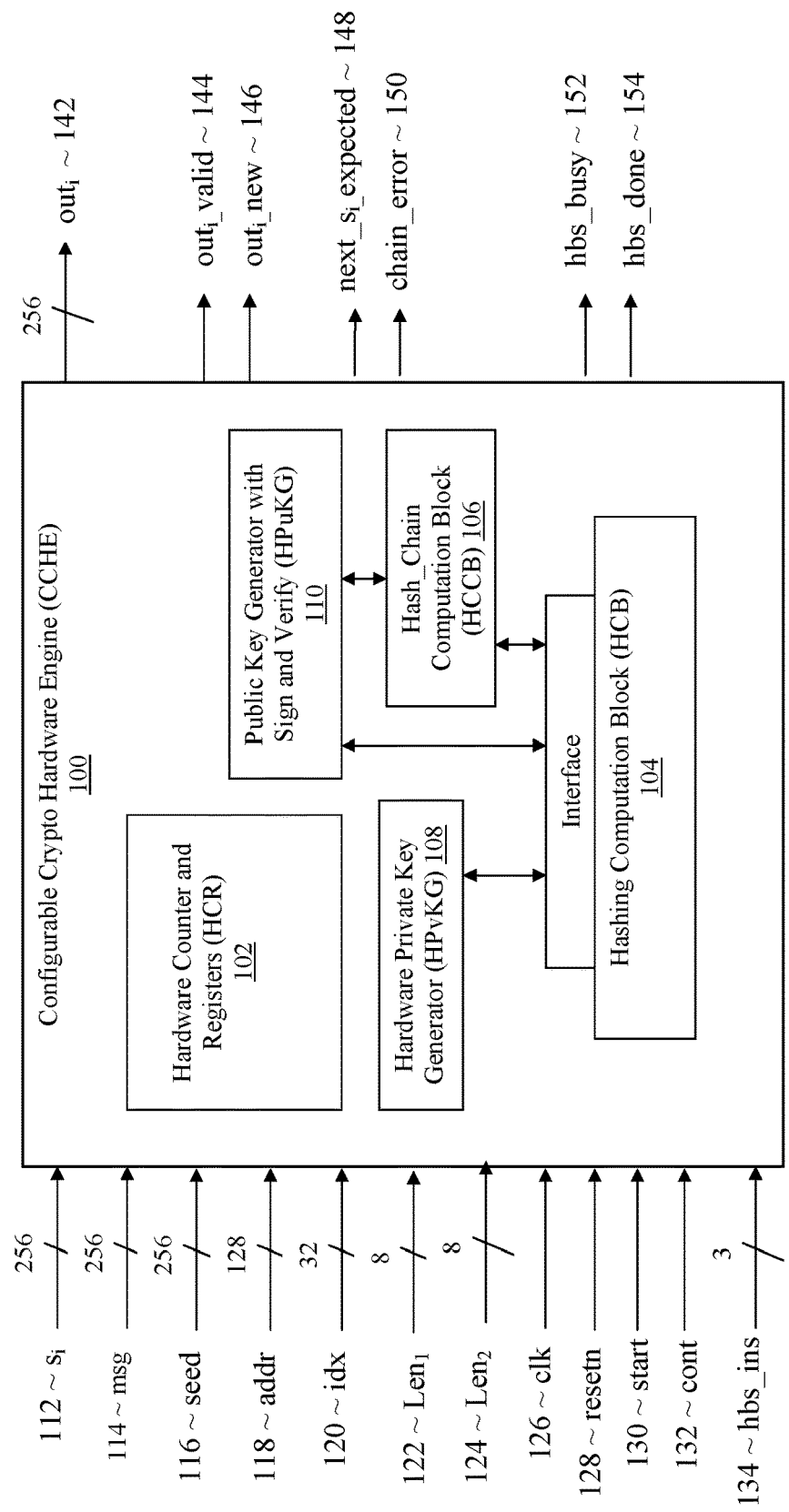
FIG. 1 illustrates a configurable crypto hardware engine of the present disclosure, in accordance with various embodiments.

Apparatuses and methods associated with configurable crypto hardware engine are disclosed herein. Embodiments of the configurable crypto hardware engine may advantageously secure communication, and potentially withstand attacks using quantum computers, including Glover-like attacks, and at the same time sufficiently efficient and compact to be implemented in hardware. In embodiments, an apparatus for signing or verifying a message may comprise: a hardware hashing computation block to perform hashing computations; a hardware hash chain computation block to perform successive hash chain computations; a hardware private key generator to generate private keys; and a hardware public key generator to generate public keys, including signature generations and signature verifications. The hardware hashing computation block, the hardware hash chain computation block, the hardware private key generator, and the hardware public key generator may be coupled to each other and selectively cooperate with each other to perform private key generation, public key generation, signature generation or signature verification at different points in time.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs generated from a plurality of programming instructions, a combinational logic circuit, and/or other suitable components that provide the described functionality.

Referring now FIG. 1, wherein a configurable crypto hardware engine of the present disclosure, in accordance with various embodiments, is shown. As illustrated, in embodiments, configurable crypto hardware engine (CCHE) 100 may include a number of hardware counters and registers (HCR) 102, hardware hashing computation block (HHCB) 104, hardware hash chain computation block (HHCCB) 106, hardware private key generator (HPvKG) 108, and hardware public key generator (HPuKG) 110 that includes signature generation and signature verification, coupled to one another. HCR 102 may include in particular a configuration register to store a configuration opcode or value, denoting the operation HHCB 104, HHCCB 106, HPvKG 108, and/or HPuKG 110 are to selectively cooperate to perform. The opcode may denote private key generation, public key generation, signature generation or signature verification. In response, HHCB 104, HHCCB 106, HPvKG 108, and/or HPuKG 110 selectively cooperate with each other and perform either the specified private key generation, public key generation, signature generation or signature verification. Accordingly, HHCB 104, HHCCB 106, HPvKG 108, and HPuKG 110 may be configurable to perform either specified private key generation, public key generation, signature generation or signature verification, at different points in time. The configurability contributes to enabling CCHE to be compactly implemented in hardware to meet the intensive computation requirements to potentially withstand attacks using the emerging quantum computers. In embodiments, the configuration register may be configured to store at least a 3-bit opcode. In embodiments, the opcode may be defined as follows: 001⇒private key generation, 010⇒public key generation, 011⇒signature generation, and 100⇒signature verification. In embodiments, in addition to the configuration register, HCR 102 may further include a number of address and/or message registers. In embodiments, HCR 102 may be implemented with any volatile or non-volatile storage medium known in the art.

In embodiments, HCB 104 may be configured to implement a lightweight hashing function, allowing a large number of hashing computations to be performed within a design point time period for highly complex cryptography to potentially withstand attacks using the emerging quantum computers. In embodiments, HCB 104 may be configured to implement Keccak-400 sponge hashing. More specifically, HCB 104 may be configured to implement Keccak-400 sponge hashing as an extendable-output function (XOF) with bitrate=128 bits, capacity=272 bits, output=128 bits, and digest=256 bits, allowing the Keccak-400 sponge hashing to be performed 5,000 times for each signature generation or signature verification for highly complex cryptography.

In embodiments, HHCB 106 may be configured to complement HCB 104 to support a corresponding high frequency of successive hash chain computations within the design point time period for highly complex cryptography. In particular, HHCB 106 may be configured to accelerate computations of a variety of hashing based signature schemes.

In embodiments, HPvKG 108 and HPuKG 110 may be configured to generate private and public keys in support of the eXtended Merkle Signature Scheme (XMSS) with Winternitz One-Time Signature (WOTS). For further information on XMSS and WOTS, see (1) XMSS—A Practical Forward Secure Signature Scheme based on Minimal Security Assumptions Second Version, 26. November 2011, Johannes Buchmann, Erik Dahmen, and Andreas Hulsing, Cryptography and Computeralgebra, Department of Computer Science, TU Darmstadt; (2) W-OTS+{Shorter Signatures for Hash-Based Signature Schemes, Andreas Hulsing, Cryptography and Computeralgebra, Department of Computer Science, TU Darmstadt; and (3) XMSS—Extended Hash-Based Signatures, Draft Oct. 28, 2016, Internet Engineering Task Force.

In embodiments, the values used for the following parameters of WOTS may be:

| Parameters | Description | Value used in this invention |
|---|---|---|
| M | Message representative length in bytes | 32 |
| N | Length in bytes on one element of the private key, public key or signature | 32 |
| W | Integer value between 4 and 16 (controls trade-off: latency vs signature size) | 16 |
| H | maximum number of signature is given by: $2^h$ | 16 |
| len1 | ceil(8m/lg(w)) | 64 |
| len2 | floor(lg(len_1·(w−1))/lg(w)) + 1 | 3 |
| len | len_1 + len_2 | 67 |

As described in Side-Channel Analysis of MAC-Keccak Hardware Implementations, Lou et al, Department of Electrical and Computer Engineering and Department of Mathematics, Northeastern University, Boston, Mass. 02115, for a Keccak function with key-size>2*plane-size, an attacker can only perform differential power attack (DPA) targeting a single key bit leakage. This attack would cost more than 3,000,000 power traces to recover a 256-bit key. With the above parameter values, length of one element of the private key is 32 bytes (256 bits). On division into two blocks of 16-bytes (128-bit) each, and apply as the inputs to the Keccak-400 hash engine consecutively, the condition of key-size>2*plane-size is met, as the plane-size is 80 bits.

In embodiments, CCHE 100 may be implemented in e.g., Intel 10 nm technology with 0.75V, 35° C., and 200 MHz, or other like processes with operating frequencies from 100 MHz to 500 MHz. For the Intel 10 nm technology embodiments, the area may be 1146 µm2, having 13 k gates. The latency at 200 MHZ may be:

Keccak400-128/256: 20 cycles,

Private key generation: 6,325 cycles=0.032 ms@200 MHz

Public key generation: 301,766 cycles=1.5 ms@200 MHz

Sign: 151,081 cycles=0.76 ms@200 MHz

Verify: 151,081 cycles=0.76 ms@200 MHz

The performance speed up in comparison to a software implementation on a 32-bit Qark processor from Intel Corporation of Santa Clara, Calif. may be

| OPERATION | LATENCY IN SOFTWARE (CLOCK CYCLES) | LATENCY IN CCHE (CLOCK CYCLES) | SPEED UP |
|---|---|---|---|
| Private key generation | 1,042,304 | 6,325 | 164x |
| Public key generation | 42,304,000 | 301,766 | 140x |
| WOTS + Sign | 21,152,000 | 151,081 | 140x |
| WOTS + Verify | 21,152,000 | 151,081 | 140x |

Still referring to FIG. 1, in embodiments, HHCB 104 or HHCCB 106 may also be selectively made available to provide hashing or hash chain computations to e.g., software of a computer system hosting CCHE 100. For some of these embodiments, the configuration register of HCR 102 may likewise be configured to store at least a 3-bit opcode as described earlier, with opcode 101 specifying performance of hash chain computations, and opcode 110 specifying performance of hashing computations.

In embodiments, CCHE 100 may further include a number of input ports and a number of output ports. Input ports may include $S_i$ 112, msg 114, seed 116, addr 118, idx 120, $Len_1$ 122, $Len_2$ 124, clk 126, resetn 128, start 130, cont 132, and hbs_ins 134. Output ports may include $out_i$ 142, out$_i$_valid 144, out$_i$_new 146, next_s$_i$_expected 148, chain_error 150, hbs_busy 152, and hbs_done 154. The functionality of these ports may be as follow:

| PORT | INPUT/ OUTPUT | WIDTH IN (BITS) | FUNCTIONALITY |
|---|---|---|---|
| S$_i$ | Input | 256 | Provides the following inputs: sk$_i$ during public key generation and signature generation; Sign$_i$ during signature verification |
| msg | Input | 256 | Hash of the whole message |
| seed | Input | 256 | Parameter used in public key generation, signing and verifying |
| addr | Input | 128 | Parameter used in public key generation, signing and verifying |
| idx | Input | 31 | Specifies which private key should be generated (among the 2^H possible) |
| Len$_1$ | Input | 8 | ceil(8M/lg(W)) |
| Len$_2$ | Input | 8 | floor(lg(len1(W−1))/lg(W)) + 1 |
| clk | Input | 1 | Functional clock input |
| resetn | Input | 1 | Active 0 asynchronous reset |
| start | Input | 1 | It is a pulse to start a new signing operation which may contain multiple elements |
| cont | Input | 1 | It is a pulse input to continue the same signing operation (which is already started) with consecutive intermediate sk$_i$ or sign$_i$. |
| Hbs_ins | Input | 3 | FIBS instruction which specifies the target operation. They are defined as: 001 => private key generation; 010 => public key generation; 011 => signature generation; 100 => signature verification; 101 => hash chain computation; 110 => hashing |
| out$_i$ | Output | 256 | Provides 256-bit outputs of sk$_i$, pk$_i$, sig$_i$, verify$_i$, hash_chain, and keccak-400_hash |
| out$_i$_valid | Output | 1 | 1 output in this port indicates that there is a valid data in the out$_i$ port |
| out$_i$_new | Output | 1 | This is a pulse, indicates that the new output is available in the out$_i$ port |
| next_s$_i$_expected | Output | 1 | 1 in this port indicates that the HBS engine is waiting for the next s$_i$ input |
| chain_error | Output | 1 | 1 means hash_chain error, i.e., i+s > W−1 |
| hbs_busy | Output | 1 | 1 means the engine is busy |
| hbs_done | Output | 1 | 1 means the engine has completed the assigned operation |

Figure 2:
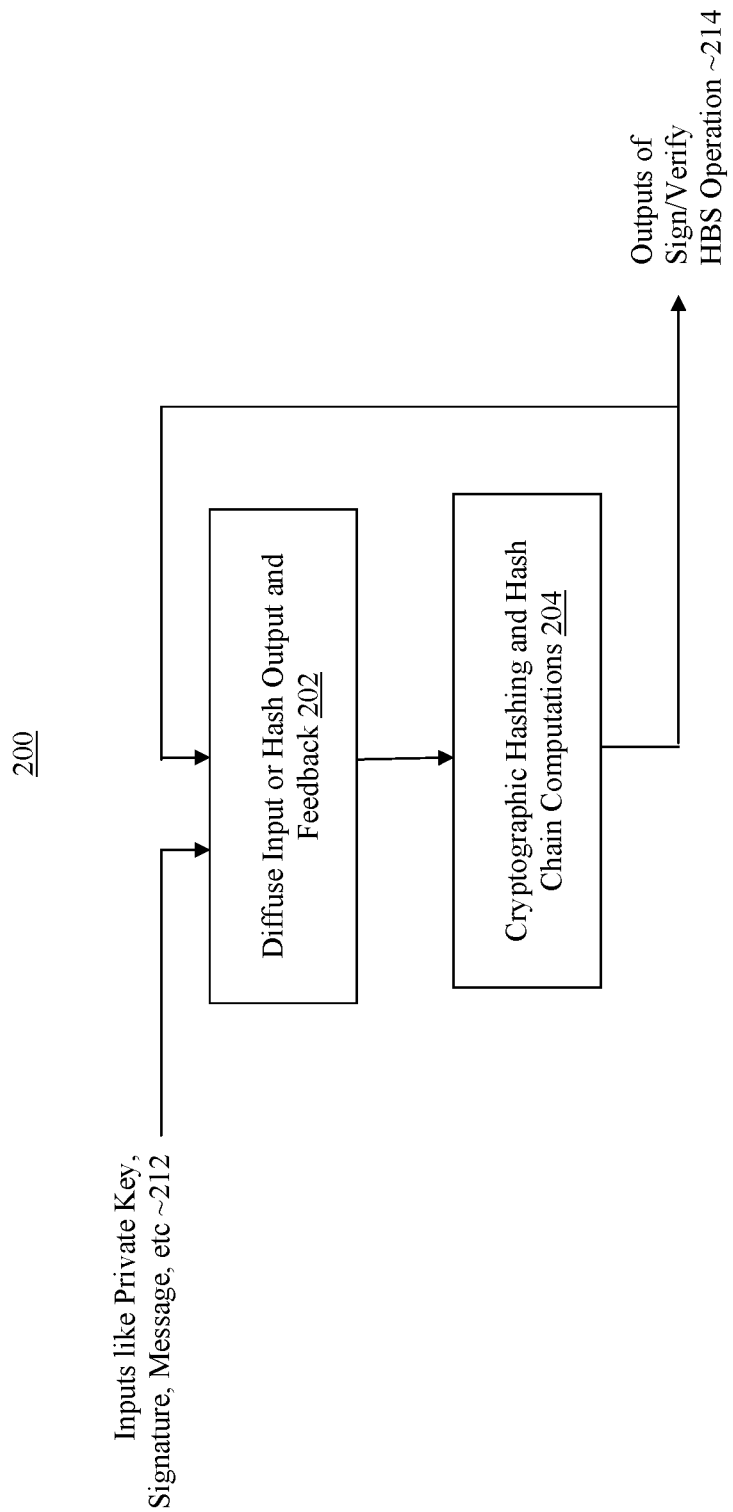
FIG. 2 illustrates an overview of the operational flow of the configurable crypto hardware engine of FIG. 1 for signature generation or signature verification, in accordance with various embodiments.

Referring now to FIG. 2, wherein an overview of the operational flow of the configurable crypto hardware engine of FIG. 1 for signature generation or signature verification, in accordance with various embodiments, is illustrated. As shown, operational flow 200 of the configurable crypto hardware engine of FIG. 1 for signature generation or signature verification may include operations performed at blocks 202 and 204. The operations may be performed e.g., by HCB 104, HCCB 106 and HPuKG 110 of CCHE 100.

Process 200 may start at block 202. At block 202, for the initial iteration, an opcode denoting signature generation or signature verification, and corresponding applicable inputs 212, such as, private key in the case of signature generation or signature and message in the case of signature verification may be received. The initial inputs, private key or signature may be diffused and successively forwarded for further processing.

From block 202, process 200 may proceed to process 204. At 204, for the initial iteration, cryptographic hashing and hash chain computations may be performed for the diffused inputs.

From block 204, process 200 may return to block 202. At 202, for subsequent iterations, results of the cryptographic hashing and hash chain computations of the immediate prior iteration may be diffused again.

From block 202, process 200 may proceed to process 204 again. At 204, for the subsequent iterations, cryptographic hashing and hash chain computations may be performed for the newly diffused results of the prior iteration.

From block 204, process 200 may return to block 202, and continue therefrom as earlier described. Process 200 may iteration thousands of times to accomplish the signature generation or signature verification for highly complex cryptography.

In embodiments, with CCHE 100 implemented as earlier described, process 200 may be iterated about 5,000 times, within a relatively short amount of time, e.g., in less than 1 ms, significantly improving the robustness of the cryptography to potentially withstand attacks using quantum computers.

Figure 3:
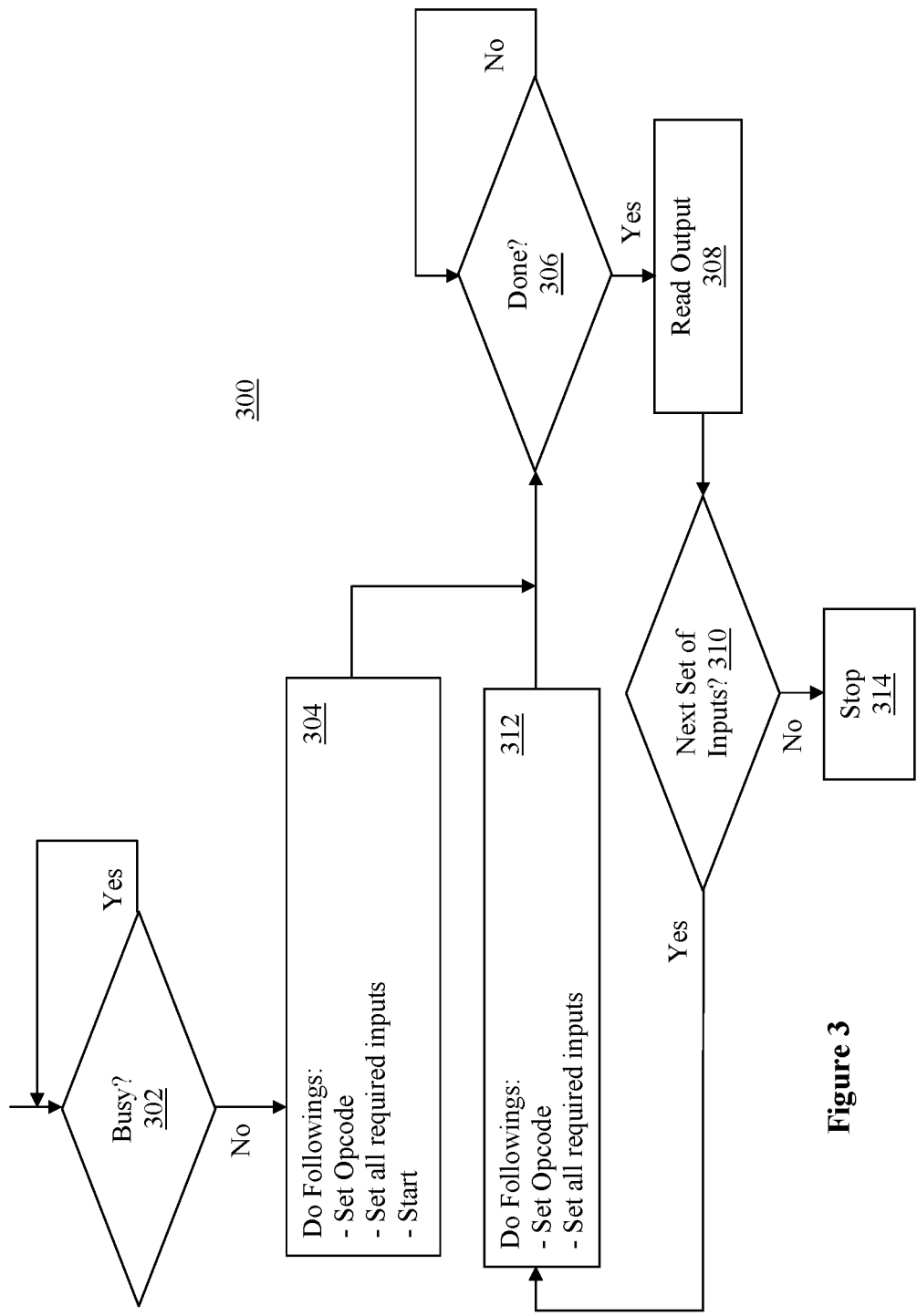
FIG. 3 illustrates an overview of the operational flow for using the configurable crypto hardware engine of FIG. 1, in accordance with various embodiments.

Referring now to FIG. 3, wherein the operational flow for using the configurable crypto hardware engine of FIG. 1, in accordance with various embodiments, is illustrated. As illustrated, process 300 for using the configurable crypto hardware engine of FIG. 1, may include operations performed at blocks 302-314. In embodiments, the operations may be performed, e.g., by a hardware host processor (such as hardware processor 402 of FIG. 4).

Process 300 may start at block 302. At block 302, a check may be performed to determine whether CCHE 100 is busy (e.g., by checking the state of port hbs_busy 152). If a result of the check indicates CCHE 100 is busy, process 300 may remain at block 302, until the result of a subsequent check indicates CCHE 100 is no longer busy.

On determining CCHE 100 is no longer busy, process 300 may proceed to block 304. At block 304, an opcode denoting the operation to be performed may be provided to CCHE 100, (e.g., by providing port hbs_instr 134 with the desired opcode). Further, the required inputs for the specified operation may be provided (e.g., by providing ports S$_i$ 112, msg 114 and so forth with the appropriate inputs). Then, a start signal may be provided to CCHE 100 (e.g., by setting port start 130).

Next, at block 306, a check may be performed to determine whether CCHE 100 has completed the specified operation (e.g., by checking the state of port hbs_done 154). If a result of the check indicates CCHE 100 has not completed the specified operation yet, process 300 may remain at block 306, until the result of a subsequent check indicates CCHE 100 has completed the specified operation. (Note the specified operation may be completed successfully or unsuccessfully, which may be indicated by the state of other port(s), such as chain_error 150).

On determining CCHE 100 has completed the specified operation, process 300 may proceed to block 308. At block 308, the output may be read (e.g., by reading ports out$_i$ 142, out$_i$_valid 144, and so forth).

Next, at block 310, a check may be performed to determine whether a next set of inputs is to be provided to CCHE 100. If a result of the check indicates a next set of inputs is to be provided to CCHE 100, process 300 may proceed to block 312.

At block 312, an opcode denoting the operation to be performed may be provided to CCHE 100, (e.g., by providing port hbs_instr 134 with the desired opcode). Further, the required inputs for the specified operation may be provided (e.g., by providing ports S$_i$ 112, msg 114 and so forth with the appropriate inputs). Process 300 may then continue at block 306 as earlier described.

The operations at block 304-312 may be repeated as many times as necessary, until eventually a result of the determination at block 310 indicates that no further inputs are to be provided to CCHE 100. At such time, process 300 proceeds to block 314 and stop.

Figure 4:
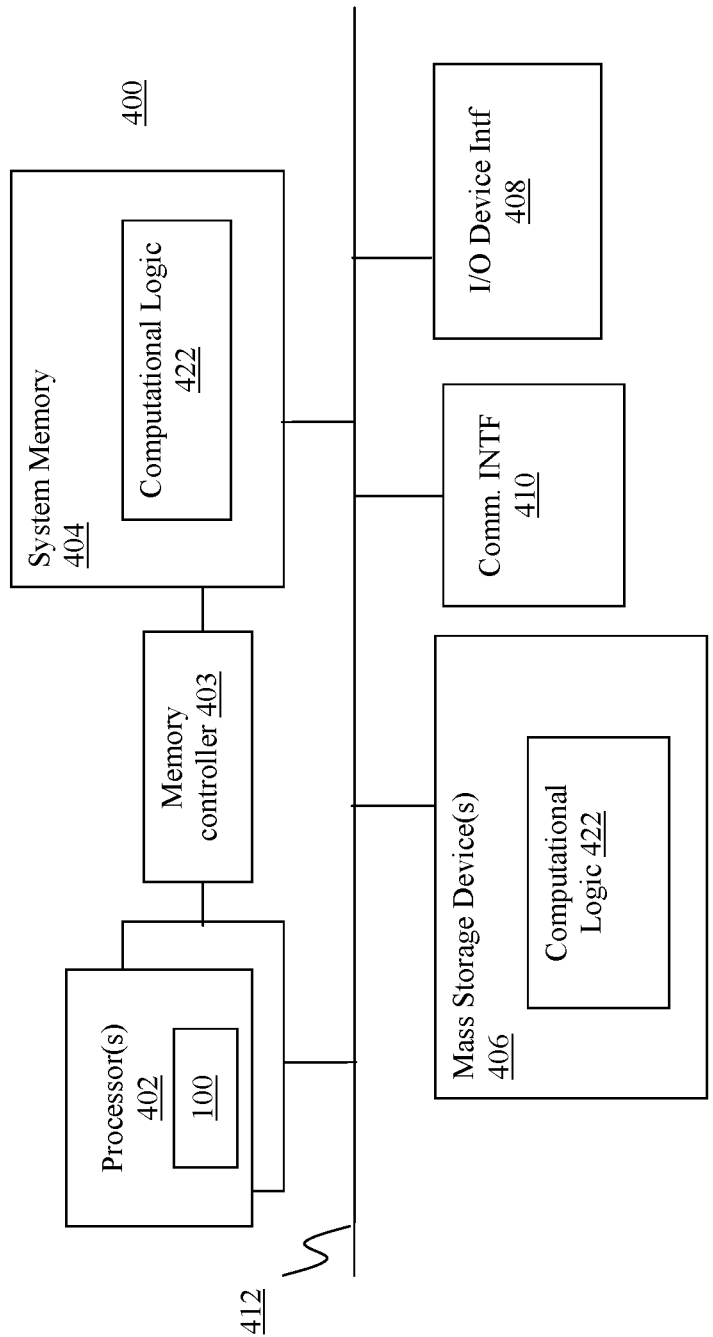
FIG. 4 illustrates a computing system suitable for practicing aspects of the present disclosure, in accordance with various embodiments.

Referring now to FIG. 4, wherein a block diagram of a computer device suitable for practice the present disclosure, in accordance with various embodiments, is illustrated. As shown, computer device 400 may include one or more processors 402, memory controller 403, and system memory 404. Each processor 402 may include one or more processor cores. One or more processors 402 may include CCHE 100 of the present disclosure. Memory controller 403 may be any one of a number of memory controllers known in the art. System memory 404 may include any known volatile or non-volatile memory.

Additionally, computer device 400 may include mass storage device(s) 406 (such as solid state drives), input/output device interface 408 (to interface with various input/output devices, such as, mouse, cursor control, display device (including touch sensitive screen), and so forth) and communication interfaces 410 (such as network interface cards, modems and so forth). In embodiments, communication interfaces 410 may support wired or wireless communication, including near field communication. The elements may be coupled to each other via system bus 412, which may represent one or more buses. In the case of multiple buses, they may be bridged by one or more bus bridges (not shown).

Each of these elements may perform its conventional functions known in the art. In particular, system memory 404 and mass storage device(s) 406 may be employed to store a working copy and a permanent copy of the executable code of the programming instructions of an operating system and one or more application collectively referred to as computing logic 422. A component of the operating system or an application may be configured to practice (aspects of) process 300 of FIG. 3. The programming instructions may comprise assembler instructions supported by processor(s) 702 or high-level languages, such as, for example, C, that can be compiled into such instructions.

The permanent copy of the executable code of the programming instructions may be placed into permanent mass storage device(s) 406 in the factory, or in the field, through, for example, a distribution medium (not shown), such as a compact disc (CD), or through communication interface 410 (from a distribution server (not shown)).

The number, capability and/or capacity of these elements 410-412 may vary, depending on the intended use of example computer device 400, e.g., whether example computer device 400 is a smartphone, tablet, ultrabook, a laptop, a server, a vehicle infotainment system, a set-top box, a game console, a camera, and so forth. The constitutions of these elements 410-412 are otherwise known, and accordingly will not be further described.

Figure 5:
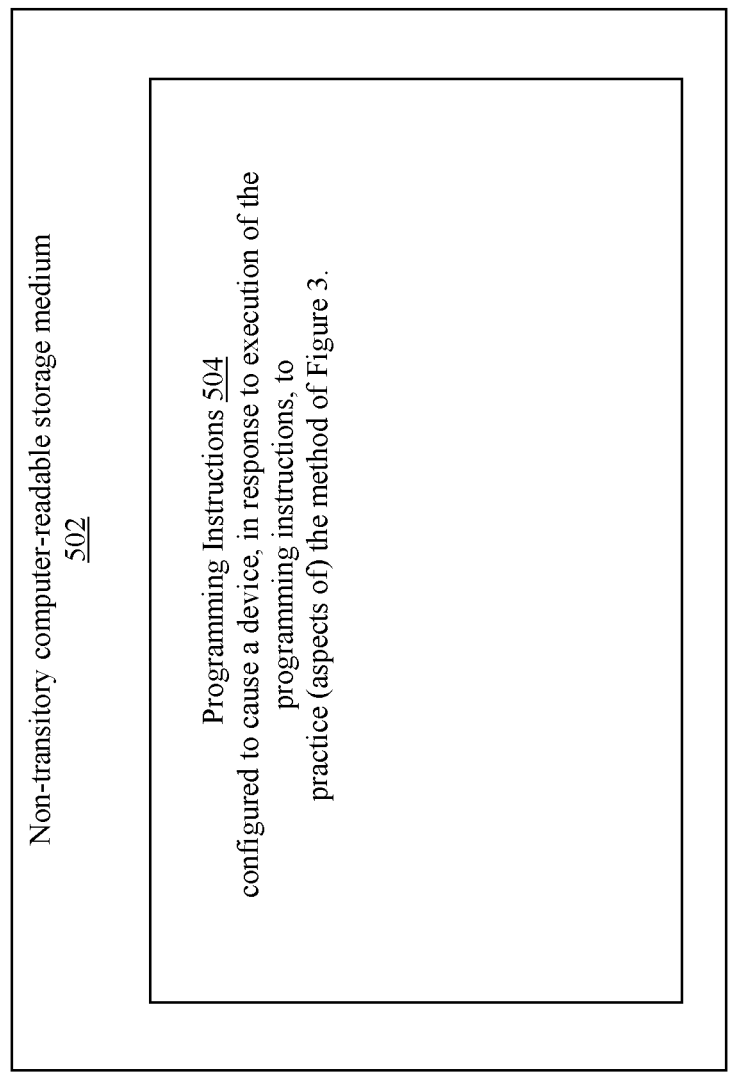
FIG. 5 illustrates an example computer-readable storage medium having instructions configured to practice (aspects of) process 300 of FIG. 3, in accordance with various embodiments.

FIG. 5 illustrates an example computer-readable storage medium having instructions configured to practice (aspects of) process 300 of FIG. 3, earlier described, in accordance with various embodiments. As illustrated, computer-readable storage medium 502 may include the executable code of a number of programming instructions 504. Executable code of programming instructions 504 may be configured to enable a device, e.g., computer device 400, in response to execution of the executable code/programming instructions, to perform (aspects of) process 300 of FIG. 3. In alternate embodiments, executable code/programming instructions 504 may be disposed on multiple non-transitory computer-readable storage medium 502 instead. In embodiments, computer-readable storage medium 502 may be non-transitory. In still other embodiments, executable code/programming instructions 504 may be encoded in transitory computer readable medium, such as signals.

Referring back to FIG. 4, for one embodiment, at least one of processors 402 may be packaged together with a computer-readable storage medium having some or all of computing logic 422 (in lieu of storing in system memory 404 and/or mass storage device 406) configured to practice all or selected ones of the operations earlier described with references to FIG. 3. For one embodiment, at least one of processors 402 may be packaged together with a computer-readable storage medium having some or all of computing logic 422 to form a System in Package (SiP). For one embodiment, at least one of processors 402 may be integrated on the same die with a computer-readable storage medium having some or all of computing logic 422. For one embodiment, at least one of processors 402 may be packaged together with a computer-readable storage medium having some or all of computing logic 422 to form a System on Chip (SoC). For at least one embodiment, the SoC may be utilized in, e.g., but not limited to, a hybrid computing tablet/laptop.

Example 1 may be an apparatus for signing or verifying a message, comprising: a hardware hashing computation block to perform hashing computations; a hardware hash chain computation block to perform successive hash chain computations; a hardware private key generator to generate private keys; and a hardware public key generator to generate public keys, including signature generations and signature verifications; wherein the hardware hashing computation block, the hardware hash chain computation block, the hardware private key generator, and the hardware public key generator are coupled to each other and selectively cooperate with each other to perform private key generation, public key generation, signature generation or signature verification at different points in time.

Example 2 may be example 1, further comprising a configuration hardware register to store an opcode to denote whether the hardware hashing computation block, the hardware hash chain computation block, the hardware private key generator, and the hardware public key generator are to cooperate to perform private key generation, public key generation, signature generation or signature verification.

Example 3 may be example 2, wherein the opcode is to further denote whether the hardware hashing computation block, the hardware hash chain computation block, the hardware private key generator, and the hardware public key generator are to cooperate to perform hashing or hash chain calculation instead.

Example 4 may be example 2, further comprising an opcode input port to input and store the opcode into the configuration hardware register.

Example 5 may be example 1, further comprising an input port to input a private key for public key generation and signature generation, or to input a signature for signature verification, depending on whether the opcode denotes whether the hardware hashing computation block, the hardware hash chain computation block, the hardware private key generator, and the hardware public key generator are to cooperate to perform private key generation, public key generation, signature generation or signature verification.

Example 6 may be example 1, further comprising an output port to output a selected one of a private key, a public key, a signature or a signature verification indicator, depending on the hardware hashing computation block, the hardware hash chain computation block, the hardware private key generator, and the hardware public key generator are to cooperate to perform private key generation, public key generation, signature generation or signature verification.

Example 7 may be example 6, wherein the output port is to further used to output a result of hashing or hash chain computation instead, when the hardware hashing computation block, the hardware hash chain computation block, the hardware private key generator, and the hardware public key generator are to cooperate to perform hashing or hash chain computation instead.

Example 8 may be example 1 further comprising a first length input port and a second length input port to input a first and a second length value; wherein the first length value (len1) equals ceil (8 m/log (w)), and the second length value equals floor (log(len1(w−1))/(log(w))+1; wherein m is a length of an input message, w is an integer value to control tradeoff between latency and signature size.

Example 9 may be any one of examples 1-8, wherein the hardware hashing computation block, the hardware hash chain computation block, and the hardware public key generator are to perform or support thousands of hashing and hash chain computations for each signature generation or signature verification in less than 1 ms.

Example 10 may be example 9, wherein the hardware hashing computation block is to perform Keccak-400 hashing, and operates at a frequency between 100 Mhz-500 Mhz.

Example 11 may be example 9, wherein the hardware hashing computation block is to perform Keccak-400 hashing as extendable output function (XOF) with bitrate of 128 bits, capacity of 272 bits, output of 128 bits, and digest of 256 bits.

Example 12 may be a method for signing or verifying a message, comprising:

setting an input port of a cryptographic hardware engine with a configuration value to indicate to the hardware cryptographic engine to perform a selected one of private key generation, public key generation, signature generation or signature verification;

storing the configuration value in a configuration hardware register of the cryptographic hardware engine; and causing a hardware hashing computation block, a hardware hash chain computation block, a hardware signature generation block and a hardware signature verification block to respond to the configuration value to selectively cooperate to perform the selected one of private key generation, public key generation, signature generation or signature verification, in view of the configuration view stored in the configuration register.

Example 13 may be example 12, wherein the configuration value is to further denote whether the cryptographic hardware engine is to perform hashing or hash chain calculation instead.

Example 14 may be example 12, further comprising setting another input port of the cryptographic hardware engine to input a private key for public key generation and signature generation, or to input a signature for signature verification, depending on whether the configuration value denotes whether the cryptographic hardware engine is to perform private key generation, public key generation, signature generation or signature verification.

Example 15 may be example 12, further comprising outputting at an output port of the cryptographic hardware engine a selected one of a private key, a public key, a signature or a signature verification indicator, depending on whether the cryptographic hardware engine performs private key generation, public key generation, signature generation or signature verification.

Example 16 may be example 15, further comprising outputting at the same output port a result of hashing or hash chain computation instead, when the cryptographic hardware engine performs hashing or hash chain computation instead.

Example 17 may be any one of examples 12-16 further comprising setting a second input port and a third input port of the cryptographic hardware engine to input a first and a second length value; wherein the first length value (len1) equals ceil (8 m/log (w)), and the second length value equals floor (log(len1(w−1))/(log(w))+1; wherein m is a length of an input message, w is an integer value to control tradeoff between latency and signature size.

Example 18 may be one or more computer-readable medium (CRM) having instructions to cause a computer device, in response to the execution of the instructions, to sign or verify a message, wherein to sign or verify a message, the computer device is caused to: set an input port of a cryptographic hardware engine with a configuration value to indicate to the hardware cryptographic engine to perform a selected one of private key generation, public key generation, signature generation or signature verification; store the configuration value in a configuration hardware register of the cryptographic hardware engine; and cause a hardware hashing computation block, a hardware hash chain computation block, a hardware signature generation block and a hardware signature verification block to respond to the configuration value to selectively cooperate to perform the selected one of private key generation, public key generation, signature generation or signature verification, in view of the configuration view stored in the configuration register.

Example 19 may be example 18, wherein the configuration value is to further denote whether the cryptographic hardware engine is to perform hashing or hash chain calculation instead.

Example 20 may be example 18, wherein the computer device is further caused to set another input port of the cryptographic hardware engine to input a private key for public key generation and signature generation, or to input a signature for signature verification, depending on whether the configuration value denotes whether the cryptographic hardware engine is to perform private key generation, public key generation, signature generation or signature verification.

Example 21 may be example 18, wherein the computer device is further caused to output at an output port of the cryptographic hardware engine a selected one of a private key, a public key, a signature or a signature verification indicator, depending on whether the cryptographic hardware engine performs private key generation, public key generation, signature generation or signature verification.

Example 22 may be example 21, wherein the computer device is further caused to output at the same output port a result of hashing or hash chain computation instead, when the cryptographic hardware engine performs hashing or hash chain computation instead.

Example 23 may be any one of examples 18-22, wherein the computer device is further caused to set a second input port and a third input port of the cryptographic hardware engine to input a first and a second length value; wherein the first length value (len1) equals ceil (8 m/log (w)), and the second length value equals floor (log(len1(w−1))/(log(w))+1; wherein m is a length of an input message, w is an integer value to control tradeoff between latency and signature size.

Example 24 may be an apparatus for signing or verifying a message, comprising: hardware means for inputting a configuration value to indicate to the cryptographic engine to perform a selected one of private key generation, public key generation, signature generation or signature verification; hardware means for storing the configuration value in the cryptographic engine; hardware means for performing hashing computations; hardware means for performing successive hash chain computations; hardware means for generating private keys; and hardware means for generating public keys, including generating signatures and verifying signatures; wherein the hardware means are selectively configurable to cooperate to generate private keys, generate public keys, generate signatures or verify signatures at different points in time.

Example 25 may be example 24, wherein the hardware means for storing the configuration value comprises means for storing a configuration value to denote whether the hardware means for hashing computations, the hardware means for hash chain computations, the hardware means for generating private keys, and the hardware means for generating public keys are to cooperate to perform private key generation, public key generation, signature generation or signature verification.

Example 26 may be example 25, wherein the configuration value is to further denote whether the hardware means for hashing computations, the hardware means for hash chain computations, the hardware means for generating private keys, and the hardware means for generating public keys are to cooperate to perform hashing or hash chain calculation instead.

Example 27 may be example 25, wherein the hardware means for inputting a configuration value further comprises means for inputting a private key for public key generation and signature generation, or inputting a signature for signature verification, depending on whether the configuration value denotes whether the hardware means for hashing computations, the hardware means for hash chain computations, the hardware means for generating private key, and the hardware means for generating public keys are to cooperate to perform private key generation, public key generation, signature generation or signature verification.

Example 28 may be example 25, further comprising means for outputting a selected one of a private key, a public key, a signature or a signature verification indicator, depending on the hardware means for hashing computations, the hardware means for hashing chain computations, the hardware means for generating private keys, and the hardware means for generating public keys are to cooperate to perform private key generation, public key generation, signature generation or signature verification.

Example 29 may be example 28, wherein the means for outputting is further used for outputting a result of hashing or hash chain computation instead, when the hardware means for hashing computations, the hardware means for hash chain computations, the hardware means for generating private keys, and the hardware means for generating public keys are to cooperate to perform hashing or hash chain computation instead.

Example 30 may be example 25 wherein the hardware means for inputting further comprises means for inputting a first and a second length value; wherein the first length value (len1) equals ceil (8 m/log (w)), and the second length value equals floor (log(len1(w−1))/(log(w))+1; wherein m is a length of an input message, w is an integer value to control tradeoff between latency and signature size.

Example 31 may be any one of examples 25-30, wherein the hardware means for hashing computations, the hardware means for hash chain computations, and the hardware means for generating public key respectively comprise means for performing or supporting thousands of hashing and hash chain computations for each signature generation or signature verification in less than 1 ms.

Example 32 may be example 31, wherein the hardware means for hashing computations comprises means for performing Keccak-400 hashing, operating at a frequency between 100 Mhz-500 Mhz.

Example 33 may be example 31, wherein the hardware means for hashing computations comprises means for performing Keccak-400 hashing as extendable output function (XOF) with bitrate of 128 bits, capacity of 272 bits, output of 128 bits, and digest of 256 bits.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for signing or verifying a message, comprising:
    a hardware hashing computation block to perform hashing computations;
    a hardware hash chain computation block to perform successive hash chain computations;
    a hardware private key generator to generate private keys; and
    a hardware public key generator to generate public keys, including signature generations and signature verifications;
    wherein the hardware hashing computation block, the hardware hash chain computation block, the hardware private key generator, and the hardware public key generator are coupled to each other and selectively cooperate with each other to perform private key generation, public key generation, signature generation or signature verification at different points in time; and
    wherein the apparatus further comprises a first length input port and a second length input port to input a first and a second length value, where the first length value (len1) is selected as a function of m and w, and the second length value is selected as a function of w, m being a length of an input message, and w being a value to control tradeoff between latency and signature size.

2. The apparatus of claim 1, further comprising a configuration hardware register to store an opcode to denote whether the hardware hashing computation block, the hardware hash chain computation block, the hardware private key generator, and the hardware public key generator are to cooperate to perform private key generation, public key generation, signature generation or signature verification.

3. The apparatus of claim 2, wherein the opcode is to further denote whether the hardware hashing computation block, the hardware hash chain computation block, the hardware private key generator, and the hardware public key generator are to cooperate to perform hashing or hash chain calculation instead.

4. The apparatus of claim 2, further comprising an opcode input port to input and store the opcode into the configuration hardware register.

5. The apparatus of claim 1, further comprising an input port to input a private key for public key generation and signature generation, or to input a signature for signature verification, depending on whether the opcode denotes whether the hardware hashing computation block, the hardware hash chain computation block, the hardware private key generator, and the hardware public key generator are to cooperate to perform private key generation, public key generation, signature generation or signature verification.

6. The apparatus of claim 1, further comprising an output port to output a selected one of a private key, a public key, a signature or a signature verification indicator, depending on whether the hardware hashing computation block, the hardware hash chain computation block, the hardware private key generator, and the hardware public key generator are to cooperate to perform private key generation, public key generation, signature generation or signature verification.

7. The apparatus of claim 6, wherein the output port is further used to output a result of hashing or hash chain computation instead, when the hardware hashing computation block, the hardware hash chain computation block, the hardware private key generator, and the hardware public key generator are to cooperate to perform hashing or hash chain computation instead.

8. The apparatus of claim 1
wherein the first length value (len1) equals ceil (8 m/log (w)), and the second length value equals floor (log(len1 (w−1)))/(log(w))+1;
wherein
w is an integer value.

9. The apparatus of claim 1, wherein the hardware hashing computation block, the hardware hash chain computation block, and the hardware public key generator are to perform or support thousands of hashing and hash chain computations for each signature generation or signature verification in less than 1 ms.

10. The apparatus of claim 9, wherein the hardware hashing computation block is to perform Keccak-400 hashing, and operates at a frequency between 100 Mhz-500 Mhz.

11. The apparatus of claim 9, wherein the hardware hashing computation block is to perform Keccak-400 hashing as an extendable output function (XOF) with a bitrate of 128 bits, capacity of 272 bits, output of 128 bits, and digest of 256 bits.

12. A method for signing or verifying a message, comprising:
setting an input port of a cryptographic hardware engine with a configuration value to indicate to the cryptographic hardware engine to perform a selected one of private key generation, public key generation, signature generation or signature verification;
storing the configuration value in a configuration hardware register of the cryptographic hardware engine;
setting a first length input port and a second length input port of the cryptographic hardware engine to input a first and a second length value, where the first length value (len1) is selected as a function of m and w, and the second length value is selected as a function of w, m being a length of an input message, and w being a value to control tradeoff between latency and signature size; and
causing a hardware hashing computation block, a hardware hash chain computation block, a hardware signature generation block and a hardware signature verification block to respond to the configuration value to selectively cooperate to perform the selected one of private key generation, public key generation, signature generation or signature verification, in view of the configuration value stored in the configuration hardware register.

13. The method of claim 12, wherein the configuration value is to further denote whether the cryptographic hardware engine is to perform hashing or hash chain calculation instead.

14. The method of claim 12, further comprising setting another input port of the cryptographic hardware engine to input a private key for public key generation and signature generation, or to input a signature for signature verification, depending on whether the configuration value denotes whether the cryptographic hardware engine is to perform private key generation, public key generation, signature generation or signature verification.

15. The method of claim 12, further comprising outputting at an output port of the cryptographic hardware engine a selected one of a private key, a public key, a signature or a signature verification indicator, depending on whether the cryptographic hardware engine performs private key generation, public key generation, signature generation or signature verification.

16. The method of claim 15, further comprising outputting at the same output port a result of hashing or hash chain computation instead, when the cryptographic hardware engine performs hashing or hash chain computation instead.

17. The method of claim 12
wherein the first length value (len1) equals ceil (8 m/log (w)), and the second length value equals floor (log(len1 (w−1)))/(log(w))+1;
wherein
w is an integer value.

18. One or more non-transitory computer-readable medium (CRM) having instructions to cause a computer device, in response to the execution of the instructions, to sign or verify a message, wherein to sign or verify a message, the computer device is caused to:
set an input port of a cryptographic hardware engine with a configuration value to indicate to the cryptographic hardware engine to perform a selected one of private key generation, public key generation, signature generation or signature verification;
store the configuration value in a configuration hardware register of the cryptographic hardware engine;
set a first length input port and a second length input port of the cryptographic hardware engine to input a first and a second length value, where the first length value (len1) is selected as a function of m and w, and the second length value is selected as a function of w, m being a length of an input message, and w being a value to control tradeoff between latency and signature size; and
cause a hardware hashing computation block, a hardware hash chain computation block, a hardware signature generation block and a hardware signature verification block to respond to the configuration value to selectively cooperate to perform the selected one of private key generation, public key generation, signature generation or signature verification, in value of the configuration value stored in the configuration hardware register.

19. The one or more CRM of claim 18, wherein the configuration value is to further denote whether the cryptographic hardware engine is to perform hashing or hash chain calculation instead.

20. The one or more CRM of claim 18, wherein the computer device is further caused to set another input port of the cryptographic hardware engine to input a private key for public key generation and signature generation, or to input a signature for signature verification, depending on whether the configuration value denotes whether the cryptographic hardware engine is to perform private key generation, public key generation, signature generation or signature verification.

21. The one or more CRM of claim 18, wherein the computer device is further caused to output at an output port of the cryptographic hardware engine a selected one of a private key, a public key, a signature or a signature verification indicator, depending on whether the cryptographic hardware engine performs private key generation, public key generation, signature generation or signature verification.

22. The one or more CRM of claim 21, wherein the computer device is further caused to output at the same output port a result of hashing or hash chain computation instead, when the cryptographic hardware engine performs hashing or hash chain computation instead.

23. The one or more CRM of claim 18,
wherein the first length value (len1) equals ceil (8 m/log (w)), and the second length value equals floor (log(len1 (w−1)))/(log(w))+1;
wherein
w is an integer value.

* * * * *